Aug. 20, 1968  D. N. MAINGUY  3,397,668
AMPHIBIOUS VEHICLE

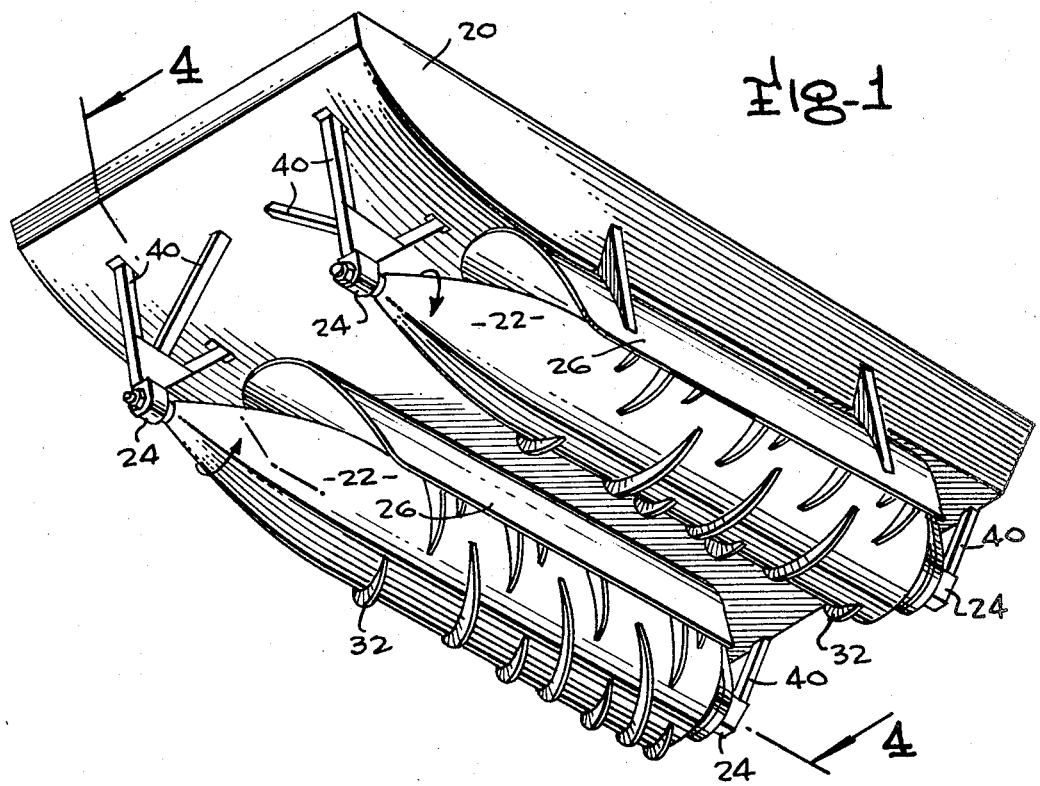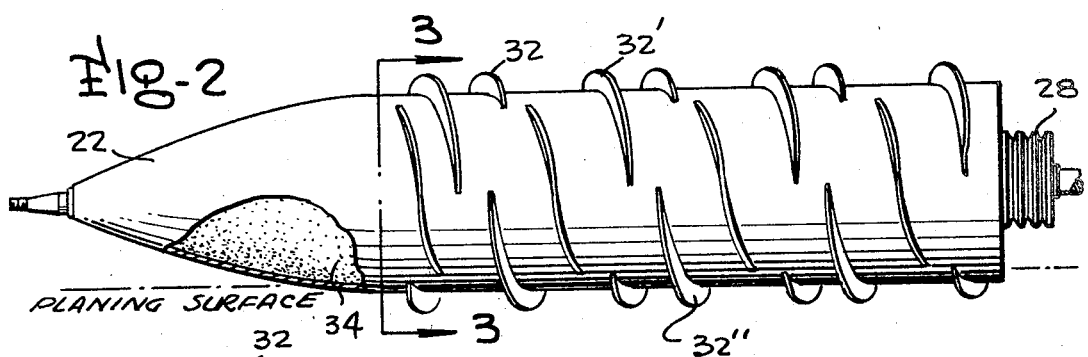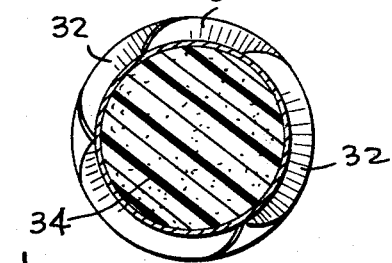

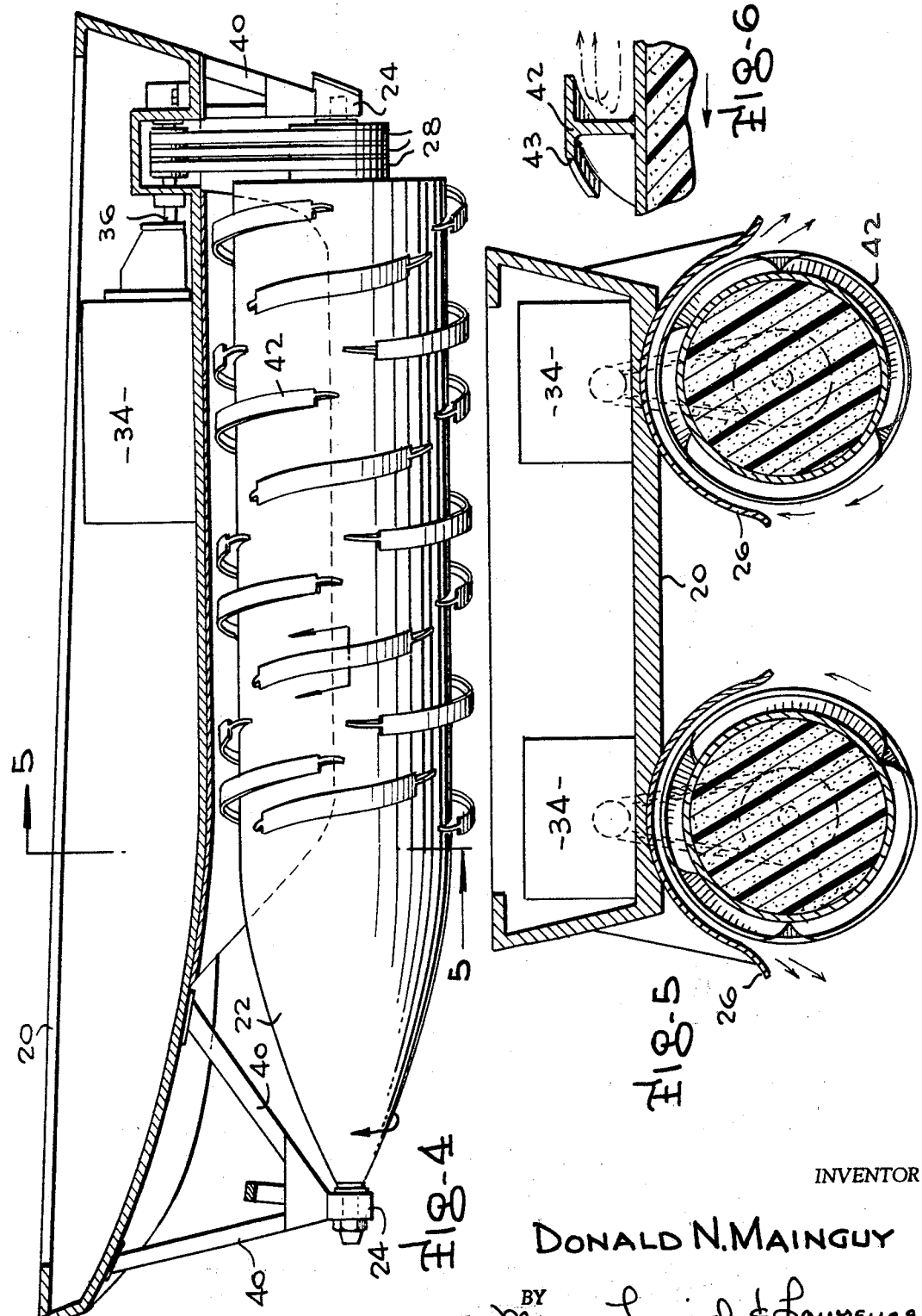

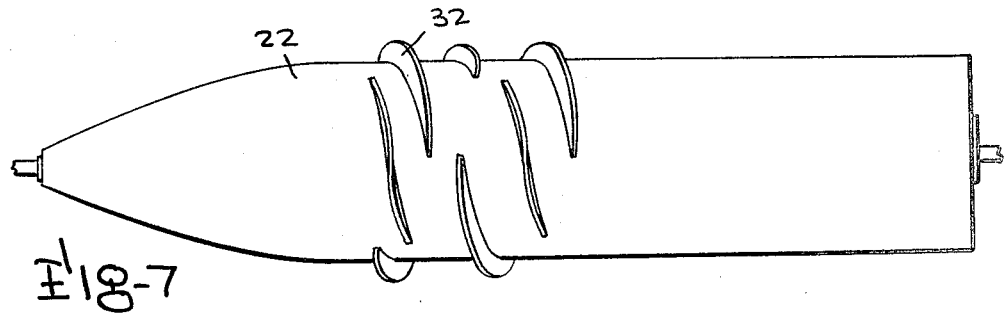
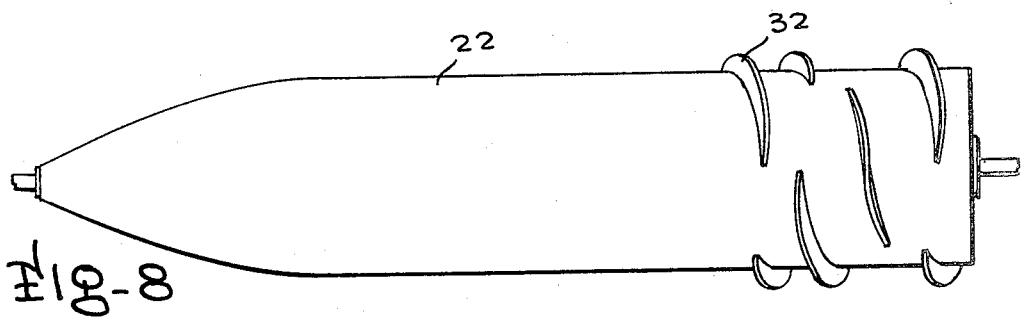
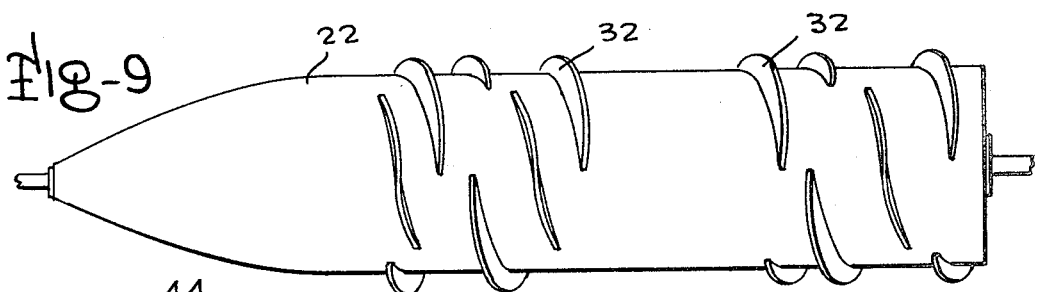
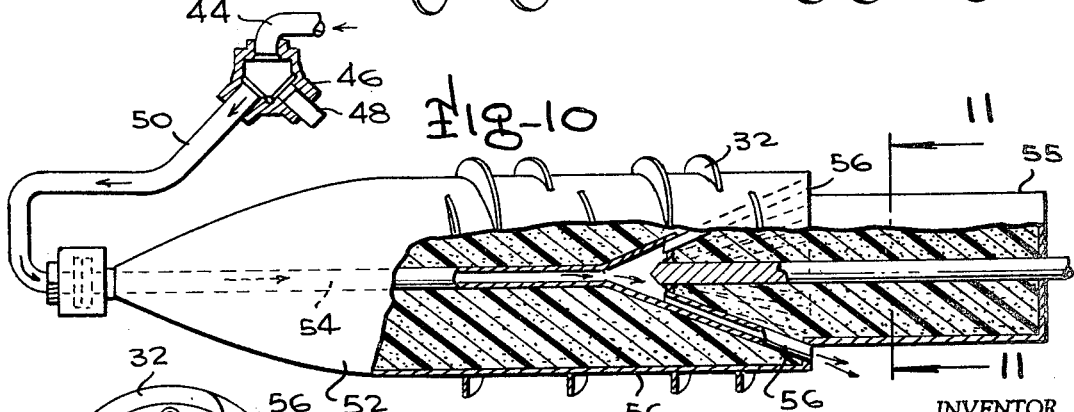

Filed April 13, 1967  4 Sheets-Sheet 4

INVENTOR
DONALD N. MAINGUY

BY Mason, Fenwick & Lawrence
ATTORNEYS

United States Patent Office 3,397,668
Patented Aug. 20, 1968

3,397,668
AMPHIBIOUS VEHICLE
Donald N. Mainguy, Montgomery, Ala., assignor of one-half to John S. Andrews, Grenada, Miss.
Filed Apr. 13, 1967, Ser. No. 630,685
15 Claims. (Cl. 115—1)

ABSTRACT OF THE DISCLOSURE

An amphibious vehicle having driven cylindrical pontoons with drive fins extending outwardly from the pontoons and oriented in non-continuous spiral configuration and alternatively including turbine and reaction thrust creating means driven by pressurized fluid from a power means.

BACKGROUND OF THE INVENTION

This invention relates to the field of vehicles, and more specifically to the field of amphibious vehicles capable of operating in bogs, swamps, marsh lands and the like.

There have been numerous attempts to provide truly amphibious vehicles which would perform well on land as well as in water. However, the known devices of this sort have proven to be inadequate in that design considerations for providing optimum land performance have always resulted in clumsy, slow and cumbersome water vehicles and vice versa.

A number of previous devices have employed generally cylindrical members having continuous fins arranged in a spiral along their periphery. When such cylindrical members are driven by a source of power to rotate the cylindrical members about their axes, the vehicle is provided with a forward or reverse movement in accordance with the direction of rotation. Examples of such devices are found in U.S. Patents Nos. 2,706,958 and 1,748,408. The fact that the fins are formed in a continuous spiral or are formed of separate discreet fins located in a continuous spiral, has resulted in extremely low speed operation due to the inherent problem of turbulence and cavitation. This invention, on the other hand, solves the problem of cavitation and turbulence so that much higher speeds are obtainable.

SUMMARY OF THE INVENTION

It is, therefore, a primary object of this invention to provide a new and improved means for propelling amphibious vehicles.

It is a further object of this invention to provide a new and improved means for propelling a vehicle both on land and in water.

The objects of this invention are achieved by provision of rotatable cylindrically shaped pontoons or propellers having fins along their peripheries with the fins being in the form of discreet separate sectors oriented with respect to each other so that each fin does not lie in the geometric continuation of the spiral of any adjacent fin.

Another feature of this invention is the provision of semi-circular splash screens associated with each of said pontoons to entrap water above the pontoons when the pontoons are driven so as to provide an additional reactive force against the fins on the pontoons. In another aspect of the invention, the fins are provided with a T-shaped cross-sectional form to lessen the amount of water removed centrifugally from the vicinity of the fins.

BRIEF DESCRIPTION OF THE DRAWINGS

FIGURE 1 is a bottom perspective view of a preferred embodiment of the invention;

FIGURE 2 is a side elevational view of one of the drive pontoons employed in the embodiment illustrated in FIGURE 1, and showing a portion of the pontoon cut away for clarity;

FIGURE 3 is a sectional view taken along lines 3—3 of FIGURE 2;

FIGURE 4 is a sectional view taken along lines 4—4 of FIGURE 1 and including an illustration of a modified propelling pontoon;

FIGURE 5 is a sectional view taken along line 5—5 of FIGURE 4;

FIGURE 6 is a sectional view taken along lines 6—6 of FIGURE 4;

FIGURE 7 is a front elevation view of another modified version of the propelling pontoon;

FIGURE 8 represents a front elevation of yet another version of the propelling pontoons;

FIGURE 9 is a front elevation of still another modified version of the propelling pontoons;

FIGURE 10 is a front elevation partially in section illustrating another modified version of the propelling pontoons;

FIGURE 11 is a sectional view taken along line 11—11 of FIGURE 10;

DESCRIPTION OF THE PREFERRED EMBODIMENT

Figure 13:
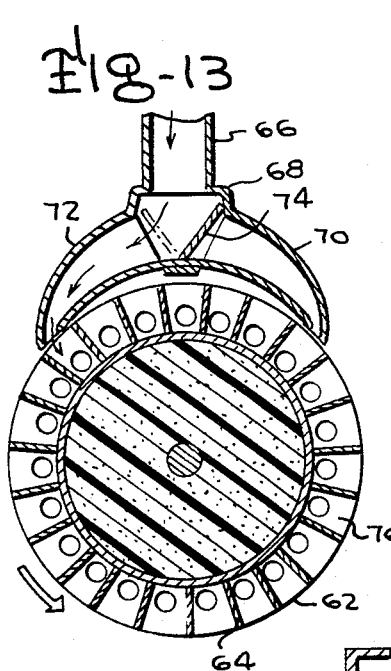
FIGURE 13 is a sectional view taken along line 13—13 of FIGURE 12.

FIGURE 1 is a bottom perspective view of a preferred embodiment of the amphibious vehicle comprising this invention. A hull member 20 of generally flat bottom configuration is provided with first and second generally cylindrical buoyant pontoons 22 which are mounted in front and rear bearing 24 and each of which is surrounded by a concentric splash screen 26. Each pontoon is tapered on its forward end and has a drive pulley 28 on a rear portion of a central shaft 30 which extends all the way through each pontoon to be received in both the front and rear bearings 24. A plurality of propelling fins 32 extend radially from the suraface of each cylindrical propelling pontoon as shown in FIGURE 2. It should also be noted that the interior of each pontoon is provided with conventional foam material or the like so as to make the pontoons unsinkable. The forward portion of each pontoon is tapered as shown in FIGURE 2 and the fins 32 extend outwardly along the length of a non-tapered portion as shown. Each fin 32 extends for approximately 120 degrees about the periphery of the cylinder as in the form of a portion of a spiral. However, the fins are oriented with respect to each other so that a geometric extension of any specific fin, such as fin 32 in FIGURE 2, would not coincide with an extension of the next adjacent fin 32′, and it is obvious, therefore, that the adjacent fins do not lie on a common spiral.

FIGURES 4 and 5 illustrate a pair of reversible power output transmission means 34 which can be driven by either a gas turbine or a gasoline or diesel engine. An output shaft 36 on each power output means drives belts 38 connected to pulleys 28 on each pontoon in an obvious manner. The two cylindrical propelling pontoons are driven in opposite directions as shown by the arrows adjacent the forward end of each pontoon, in FIGURE 1. The belts 38 can be in the form of V-belts or they may be gear belts of conventional design. Each of the bearings 24 is rigidly attached to the hull 20 by struts 40.

Orientation of the different fins so that they do not lie on a common spiral provides a minimum amount of cavitation turbulence with an optimum drive efficiency. The arrangement of the fins is such that water flows around each fin and a relatively solid mass of water is moved into the path of the next fin so that a solid "bite" is achieved by the next fin. The efficiency of each pontoon is also greatly enhanced by virtue of the splash screen surrounding each pontoon in a concentric manner as best illustrated in FIGURE 5. This is true because the splash screen causes a much larger mass of water to be in reactive engagement with the fins on each pontoon than would be possible otherwise.

FIGURES 4, 5, and 6 illustrate an amphibious vehicle identical with the vehicle of FIGURE 1 with the exception that the cylindrical propelling pontoon 32 has T-shaped fins 42 extending from its surface in the same relative positions as the fins 32 of the embodiment illustrated in FIGURE 1. These fins are formed of a primary web portion 42' capped by outer flange 43. The T-shaped fins retard the motion of the water outwardly from each particular fin and direct it rearwardly in the manner illustrated in FIGURE 6. Consequently, greater thrust is achieved. Further, the outer flat surface of the T-shaped fin is, in itself, a planing surface, and the total of all these flat horizontal T-section surfaces become additional planing surfaces increasing lift. In addition, surfaces 42 and 43, FIGURE 6, being the inner and outer horizontal planes of the T-shaped fins, lessen the up and down or vertical pitching of the craft by exerting a resistance against the water.

FIGURE 7 illustrates a modified form of cylindrical propelling pontoons wherein the fins 32 are located solely along the forward portion of the pontoon. The specific advantage of this arrangement is that the pontoons will tend to have a higher planing speed than is possible with the other embodiments. This is true because the rear flat portion of the pontoon provides an optimum planing surface.

Fins located solely along the rear portion of pontoon 32 are the distinctive characteristics of the embodiment illustrated in FIGURE 8. The specific advantage of this embodiment is that high speeds are possible in a manner similar to the embodiment of FIGURE 7. However, the embodiment of FIGURE 8 has the advantage that the fins would always be in biting engagement with the water even in rough seas. Consequently, the inherent strains and vibrations created by the pontoons running free is avoided.

FIGURE 9 illustrates another embodiment wherein the fins are located at both the front and rear portion of the pontoon but there are no fins in a central portion of the pontoon as shown in FIGURE 9. This embodiment has the advantage of both the pulling and pushing fin arrangement of FIGURES 7 and 8 discussed previously and also gives a balanced drive when the craft rolls sideways upon a beach or over a sand bar. The movement of the craft over such constructions is greatly enhanced by the fact that the outer periphery of the flanges is in essence a wheel as shown in FIGURE 4; these wheels being fore and aft leaving a raised portion in the central section of the pontoon to more easily clear ground obstructions.

FIGURES 10 and 11 illustrate another pontoon embodiment wherein the exhaust gases from the power means create a cushion under the aft planing portion of the pontoon to lessen friction, hull drag and in particular stern drag by decreasing friction under the aft portion of the pontoons when the vessel is proceeding in a forward motion at planing speeds. In effect, this embodiment employs the step principle as in a step hydroplane but in addition, improves the step function by injecting thrust aft through apertures in the step to increase forward motion and to lessen stern drag and increase lift by laying a cushion of bubbles and/or gasses under this aft portion of the planing pontoon.

The foregoing results are achieved by conducting exhaust from the power means into an exhaust conduit 44 from which it flows into a valve assembly 46 which can open to the atmosphere by passageway 48 to enable easy engine starting. Only one such pontoon is shown in FIGURE 10. However, it can be seen that exhaust would be applied to the other pontoon in the same manner that the exhaust portions flowing through conduit 50 is applied to pontoon 52. The fins 32 on pontoon 52 are oriented in the same manner as are fins in the previously discussed embodiments. Conduit 50 connects with a central conduit 54 which extends axially through pontoon 52. The aft portion of pontoon 52 is defined by a cylindrical portion 55 having a smaller outside diameter than the primary cylindrical portion 56 upon which the fins are mounted. Central passageway 54 terminates in a plurality of inclined passageways 56 which open to the atmosphere at a point immediately adjacent the outer periphery of the reduced diameter portion 55 as shown in FIGURES 10 and 11. The continuous flow of exhaust gasses outwardly through passageways 56 provide a reaction thrust in a forward direction and also creates a cushion of bubbles along the reduced portion 55 which greatly lessens the fluid friction between the pontoons and the sea surface during the planing of the pontoons.

Figure 12:
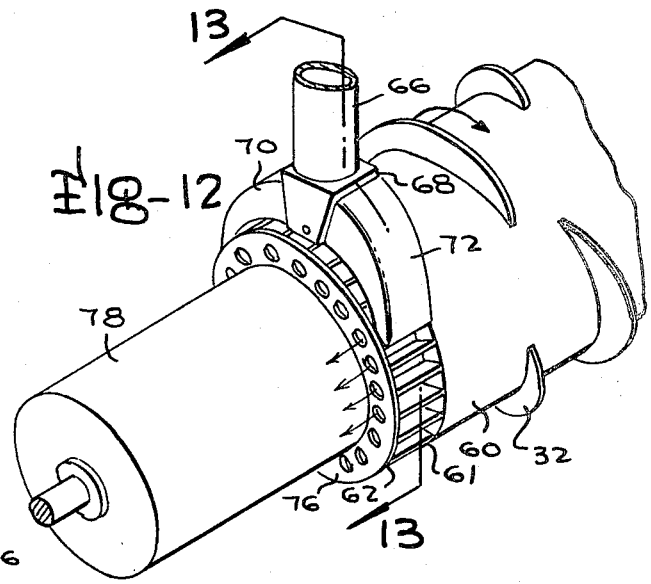
FIGURE 12 is a perspective view of modified means for rotating a propelling pontoon.

FIGURES 12 and 13 illustrate a turbine drive system which eliminates the need for belts or chain drives for rotating the respective pontoons. The rear portion of a cylindrical pontoon 60 having fins 32 oriented along its periphery in the manner of the previously discussed embodiments is provided with a turbine wheel 62 having blades 64 continuously about its periphery. A fluid conduit 66 conducts pressurized fluid, which may be either in the form of exhaust gases from a gas turbine, or in the form of pressurized water from a pump, to a dual output nozzle 68 having first and second output nozzle means 70 and 72 which are selectively connected to conduit 66 to receive pressurized fluid. A valve member 74 is selectively operable to divert the fluid into one or the other nozzle means 70 or 72. The fluid flow is being diverted into nozzle 72 as shown in FIGURE 13 so that the fluid impinges on the various blades 64 to cause the turbine to rotate in a counter-clockwise direction in FIGURE 13. The rear rim 76 of the turbine is provided with a series of apertures located between each of the blades 64 to permit a portion of the fluid or gas to escape in a rearward direction as indicated by the arrows in FIGURE 12. This provides additional thrust for forward movement while providing a cushion of gas (when a gas turbine is employed) to reduce stern drag and add to planing effectiveness as previously described. The valve 74 is adjusted in accordance with the direction of pontoon rotation desired. It should be noted that the rear portion of the pontoon 60 has a reduced diameter portion 78 as shown in FIGURE 12.

Figure 15:
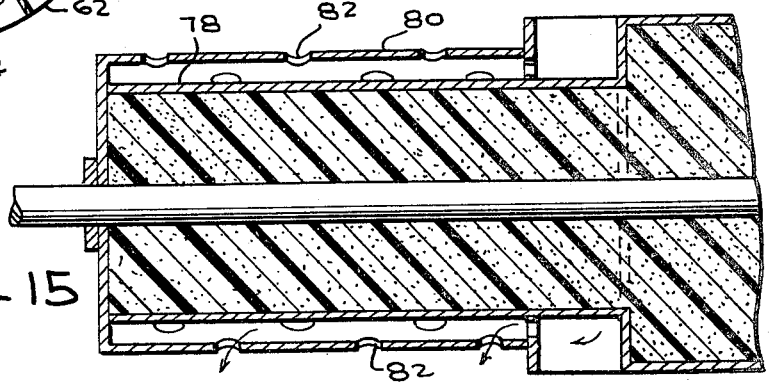
FIGURE 15 is sectional view taken along lines 15—15 of FIGURE 14.
Figure 14:
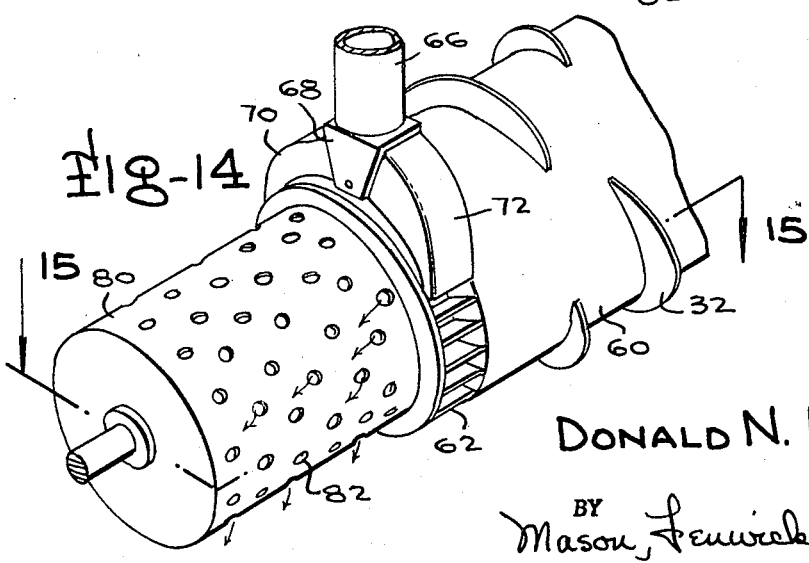
FIGURE 14 is a perspective view of another modified means for providing rotation and low friction to a propelling pontoon.

FIGURES 14 and 15 illustrate a modified version of the embodiment of FIGURES 12 and 13. In the modified version, an additional apertured sleeve 80 surrounds the reduced diameter portion 78. The apertured sleeve 80 has a large number of openings 82 through which the exhaust gasses can escape when gas is used as a motive source for turbine 62. Escape of the exhaust gasses reduces the hull drag of friction of the pontoon in an obvious manner.

It should be understood that the drive systems illustrated in FIGURES 12 through 14 could be employed with pontoons having fins arranged in any of the previously discussed modes.

Obviously many modifications and variations of the present invention are possible in the light of the above teachings. It should, therefore, be understood that numerous modifications or alterations may be made without de-

I claim:

1. An amphibious vehicle comprising:
   hull means;
   power means mounted within said hull means;
   first and second generally cylindrical pontoons rotatively suspended beneath said hull means;
   a plurality of propulsion fins in the form of spiral sectors extending outwardly from the surface of each of said pontoons and wherein each of said fins is oriented with respect to the other fins so that adjacent fins do not lie within a geometric continuation of a spiral of any adjacent fin;
   a semi-circular splash screen associated with each pontoon a slight distance outward from the outer periphery of each fin and concentric with the axis of each respective pontoon; and
   power transmitting means connecting each pontoon with said power means for rotating said pontoons.

2. The device of claim 1 wherein said fins are located solely upon a forward portion of each of said pontoons.

3. The device of claim 1 wherein said fins are located solely upon a rearward portion of each of said pontoons.

4. The device of claim 1 wherein said fins are located upon front and rear portions of each of said pontoons and wherein there is an open space having no fins located between said front and rear portions of said pontoons.

5. The device of claim 1 additionally including means for conducting exhaust gasses from said power means to a plurality of rearward facing exhaust openings in each of said pontoons.

6. The device of claim 5 wherein said exhaust openings are oriented in a circle about the periphery of each of said pontoons and including a reduced diameter trailing cylindrical portion mounted rearwardly of said exhaust openings and having a diameter less than the diameter of the circle in which said exhaust openings are located.

7. The device of claim 1 including turbine means formed in each of said pontoons and wherein said power transmitting means comprises means for conducting exhaust gasses from said power means to said turbine to provide an additional drive force to rotate each of said pontoons.

8. The device of claim 7 additionally including a hollow sleeve member located rearwardly of said turbine member to receive exhaust gasses from said turbine member and including a plurality of openings in said sleeve through which said exhaust gasses egress so as to provide a low friction contact between said sleeve and environmental water in which said vehicle is operated.

9. The device of claim 1 wherein each of said fins is formed of a generally radially extending primary flange having a circumferentially concentric outer flange oriented perpendicularly thereto so that said fins are generally T-shaped in cross section.

10. The device of claim 9 wherein said fins are located solely upon a forward portion of each of said pontoons.

11. The device of claim 9 wherein said fins are located solely upon a rearward portion of each of said pontoons.

12. The device of claim 9 wherein said fins are located upon front and rear portions of each of said pontoons and wherein there is an open space having no fins located between said front and rear portions.

13. The device of claim 1 wherein said power transmitting means comprises nozzle means for directing a high-pressure water jet onto a turbine formed coaxially of each of said pontoons for rotatively driving each of said pontoons.

14. Propulsion means for a water vehicle comprising:
   generally cylindrical elongated drive means mounted for rotation on said vehicle;
   a plurality of propulsion fins along the length of said drive means in the form of spiral sectors extending outwardly from the surface of said cylinder and oriented with respect to each other so that adjacent fins do not lie within the geometric continuation of a spiral of any adjacent fin; and
   drive means connected to each of said cylindrical means for rotating same to cause said vehicle to move in a desired direction.

15. The device of claim 14 wherein each of said fins is formed of a generally radially extending primary flange having a circumferentially concentric outer flange oriented perpendicularly thereto so that said fins are generally T-shaped in cross-section.

References Cited

UNITED STATES PATENTS 3,229,658  1/1966  Schrader _____ 115—1

ANDREW H. FARRELL, *Primary Examiner.*